(No Model.) 2 Sheets—Sheet 1.
G. J. SQUIRES.
WASHING MACHINE.
No. 395,596. Patented Jan. 1, 1889.
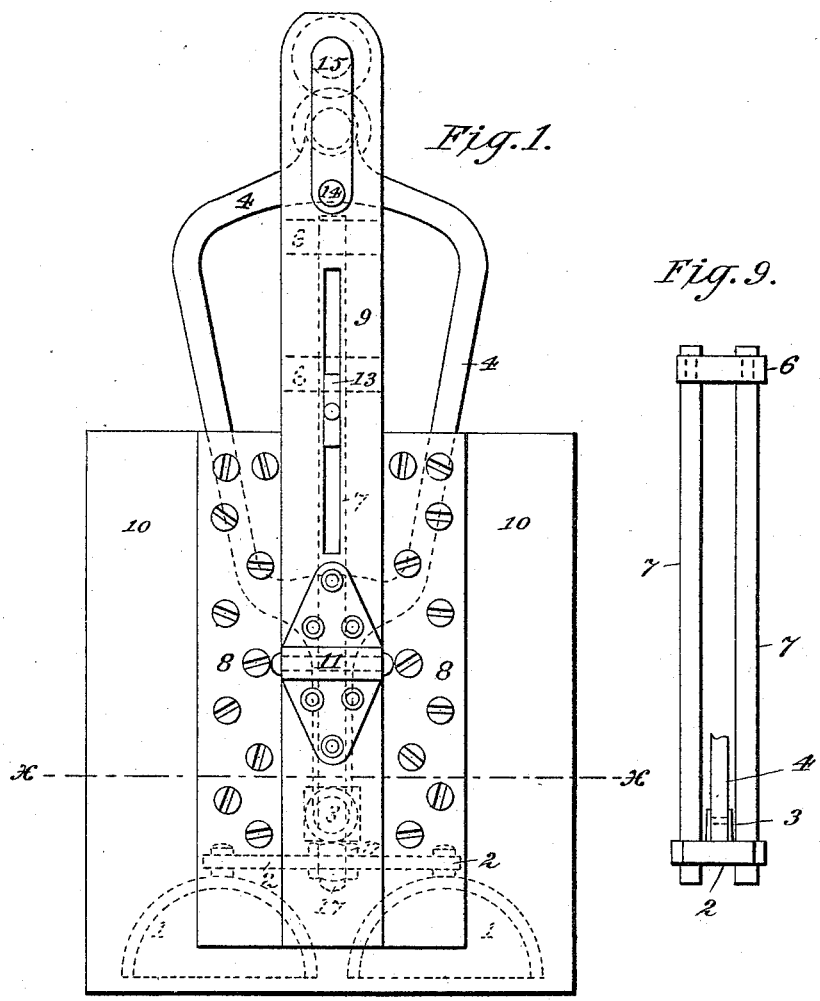
Fig. 1.
Fig. 9.
Fig. 3.
Fig. 4.
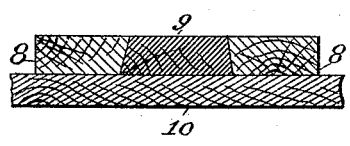
Witnesses:
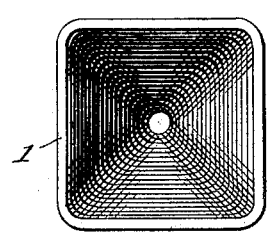
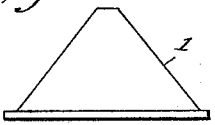
Inventor:
George J. Squires.
By his attorneys

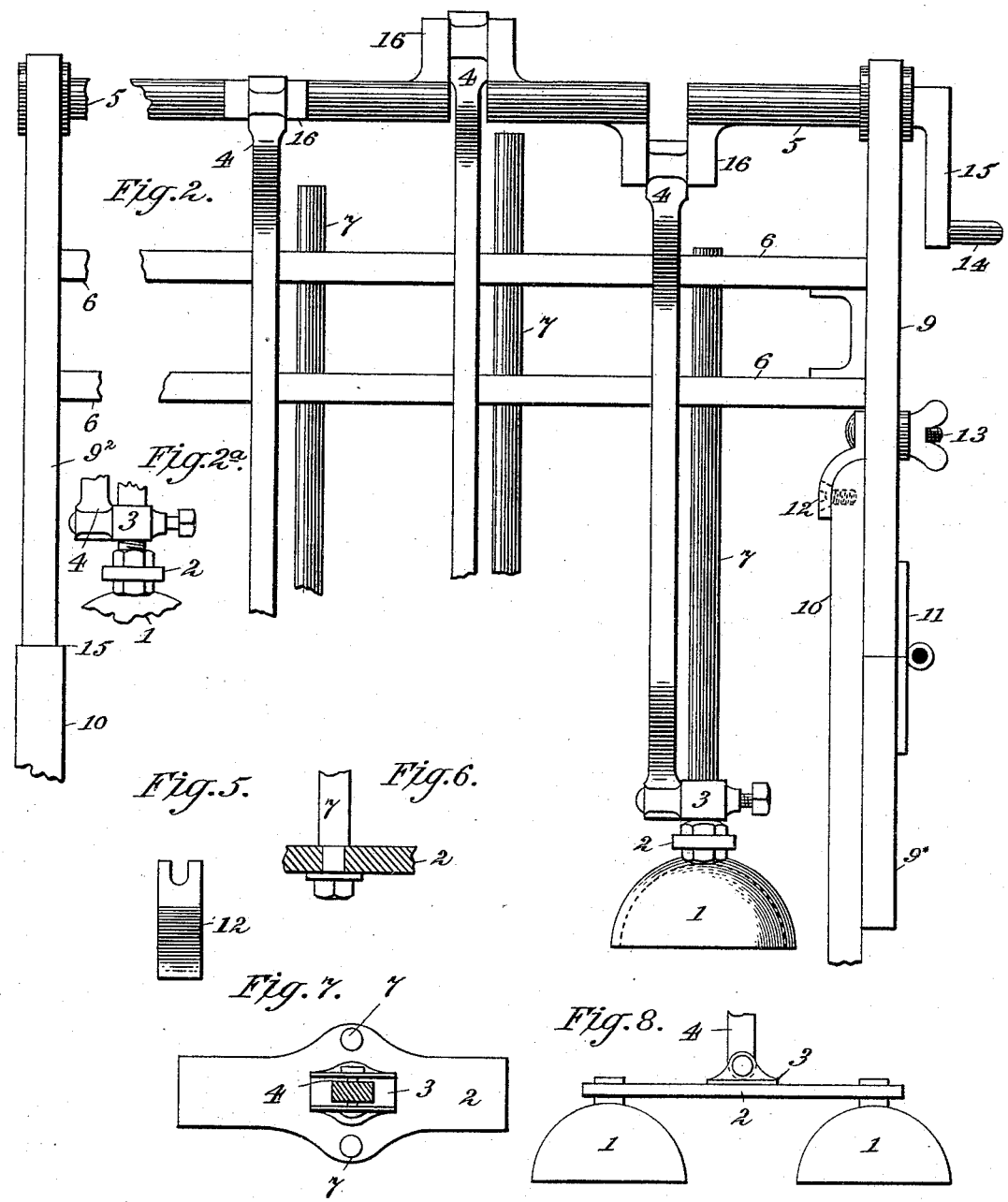

UNITED STATES PATENT OFFICE.

GEORGE J. SQUIRES, OF AURORA, ILLINOIS.

WASHING-MACHINE.

SPECIFICATION forming part of Letters Patent No. 395,596, dated January 1, 1889.

Application filed September 3, 1887. Serial No. 248,686. (No model.)

*To all whom it may concern:*

Be it known that I, GEORGE J. SQUIRES, of Aurora, in the county of Kane and State of Illinois, have invented certain new and useful Improvements in Washing-Machines; and I do hereby declare that the following is a full, clear, and exact description of the invention, which will enable others skilled in the art to which it appertains to make and use the same, reference being had to the accompanying drawings, and to figures of reference marked thereon, which form a part of this specification.

My invention relates to a special construction, the details of which will be apparent from the following.

In the drawings, Figure 1 is an end view of the mechanism, showing a part of the box and the supports for the crank-shaft. Fig. 2 is a side view of the same; Fig. 2$^a$, a detail of Fig. 1, showing the cross-bar lowered. Fig. 3 is a cross-section through line $x$ $x$ of Fig. 1. Fig. 4 shows in plan and in elevation a pyramidal form of cup; Fig. 5, a front view of an angle-iron. Figs. 6, 7, and 8 show modifications of arrangement, and Fig. 9 a variation in which the cross-bar slides on fixed rods.

1 1 represent inverted cups, of which I usually have six in a machine, and they are arranged in pairs, two being firmly fastened to each cross-bar, marked 2 in the drawings, (one pair only being shown,) the others being similarly made and operated. The guide-rod 7 is fastened to this cross-bar 2, as shown, and extends upward and through the cross-pieces 6 6, insuring a parallel motion, as they are caused to move up and down by turning the crank-shaft 5, it being understood that each pair of cups is operated from the same shaft, 5, by a crank thereon and by a connecting-rod. Such connecting-rod 4 is attached to the guide-rod, near the cross-bar 2, by means of a stud or wrist-pin, 3, as shown, and this stud is secured to and upon the guide-rod by means of a "set-screw." The top end of the connecting-rod is connected to the crank in the usual manner. It will now be seen that when the crank 5 is caused to revolve motion is imparted through the rods 4 to the inverted cups 1, and they are caused to move up and down to the exact extent of the throw of the crank. The connecting-rod 4 is preferably made "skeleton" or open, (see Fig. 1,) to accommodate the cross-pieces 6 6, which extend through such opening in the rod.

Referring to Fig. 2, the thickness of the box is shown at 10; also the thickness of the supports 9 for the crank-shaft 5. A strap-hinge, 11, is well fastened to the support 9 by means of wood-screws, in the usual manner of fastening such hinges. At the longitudinal center of the hinge 11 the support 9 is severed, to allow the whole mechanism (which is secured to the support 9) to be thrown over to one side of the box when not in use. To understand how this is done, reference may be made to Fig. 3, which shows a plan view of a portion of the end of the box.

The pieces 8 8 are screwed firmly to the box, and the support 9 for the crank-shaft is dovetailed between these pieces, and when in position is held to its place by means of the angle-iron 12 and thumb-screw 13, as shown. This angle-iron is screwed fast to the inside of the box, and where the bolt passes through it it is slotted to permit the bolt to be raised up out of the slot. The support 9 is also slotted from where the bolt passes through it downward to the strap-hinge. The cross-pieces 6 6 are firmly fastened to the supports 9 and 9$^2$ by means of angle-irons and carriage-bolts or wood-screws, and the shaft 5 has its two opposite bearings in the same upright supports, 9 and 9$^2$; but there is no hinge at the point or line 15 where the support 9$^2$ rests on the top edge of box 10.

The operation of the machine may be described as follows: It should be borne in mind, however, that there are preferably three stamps or pairs of cups in a machine, each arranged as shown in Fig. 2, and that each end of the box, and also the support for the crank-shaft, is arranged as shown in Fig. 2, except that the hinge is at one end. Before putting the clothes to be washed into the box, which may be of any suitable size or shape, the thumb-nut 13 is unscrewed, and all the machinery (including supports, crank-shafts, &c.) is raised up until the center of the hinge shall be at or above the top of box 10, and it is then turned over by means of the hinge out of the way, leaving the box itself wide open. The clothes are then folded and put into the box and the hot soapsuds poured in. The machinery is again turned over, then lowered into position, and the thumb-nut stightened. By means of the handle 14 in the outside crank, 15, the crank-shaft 5, and consequently the cranks 16 thereon, be they more or less in number, are caused to revolve, and the inverted cups 11 to move up and down. It is intended to put in water enough to a little more than cover the clothes, so that the stamps, (inverted cups 1,) as they are lifted by the crank, shall come up out of the water. As they descend they are filled with air, because they are simply inverted cups and have no valve or outlet in the cup through which air can escape, and as they strike the water the air is compressed, and this compression forces the water through the clothes, repeating the operation so rapidly as to thoroughly cleanse the clothes. As the stamps are rendered adjustable vertically by means of the nuts 17 17, or by raising the crank-shafts and supports 9 $9^2$, and as they always force down against the clothes a confined cushion of air, the clothes are never injured, the principle involved being simply to force jets of water through the clothes by means of compressed air.

The several cranks are, as shown, so arranged on their shaft 5 that the pairs of stamps will not all move coincidently, but will follow each other, and the clothes that would naturally be raised upward by suction by one pair of ascending stamps will be pressed off and downward again by the next pair of stamps while descending.

Fig. 4 is a plan and an elevation of one form of metal cups. They may be of gray iron, malleable iron, tin, or stamped in sheet metal. In practice both wood and sheet-metal cups are used, as preferred. Those shown in the drawings represent wood.

Instead of attaching the connecting-rod 4 to a stud, 3, it may be fastened directly to the center of the cross-bar 2, as shown in Figs. 7 and 8.

The guide-rods may be fastened at their lower ends to the cross-bar 2—as, for instance, by a shouldered end and nut or nut and washer, as shown in Fig. 6.

Two guide-rods, 7, (see Fig. 7,) may be used instead of one, each being firmly secured to the cross-bar 2 by such shouldered end, as above stated, and as shown in Fig. 6. This gives great steadiness, as the guide-rods move up and down in line with each other through the cross-pieces 6 6; or, if desired, these two guide-rods may be fastened to the lower piece 6, and the cross-bar 2 may slide up and down on these rods. In such case it would be desirable to fasten the upper ends of these rods by shouldered ends and nuts to the lower cross-piece 6, and the threads and nuts at their lower ends would then be dispensed with, because the cross-bar 2 would then slide up and down on these rods, which would be stationary. These variations are mechanical equivalents dependent upon whether it be preferred to have the bars 2 ride on the rods 7 or to carry these rods with them.

I claim—

1. In combination with the box or case, the slotted supports 9 $9^2$, cleats 8 8, the alternating stamps and crank-shaft upheld by said supports, hinge 11, slotted angle-iron 12, and thumb-screw 13, all substantially as and for the purposes set forth.

2. In a washing-machine, the combination of a tank, a frame hinged at one side of said tank, said hinged frame carrying and supporting the crank-shaft and crank-rods, vertical guide-rods, and a series of inverted cups, the combination serving, upon lifting the frame on its hinge, to lift with it all said devices, substantially as shown, and for the purposes set forth.

3. In combination, the box 10, frame or supports 9 $9^2$, hinged at 11, crank-shaft 5, cross-pieces 6 6, skeleton rods 4, inverted cups 1, working alternately in pairs, guide-rods 7, and angle-iron 12, all substantially as shown and described.

GEORGE J. SQUIRES.

Witnesses:
MILTON D. GUNLY,
E. B. MIX.